Sept. 1, 1936.    W. C. SANDERS    2,052,897
AXLE BEARING LUBRICATOR
Filed July 20, 1935
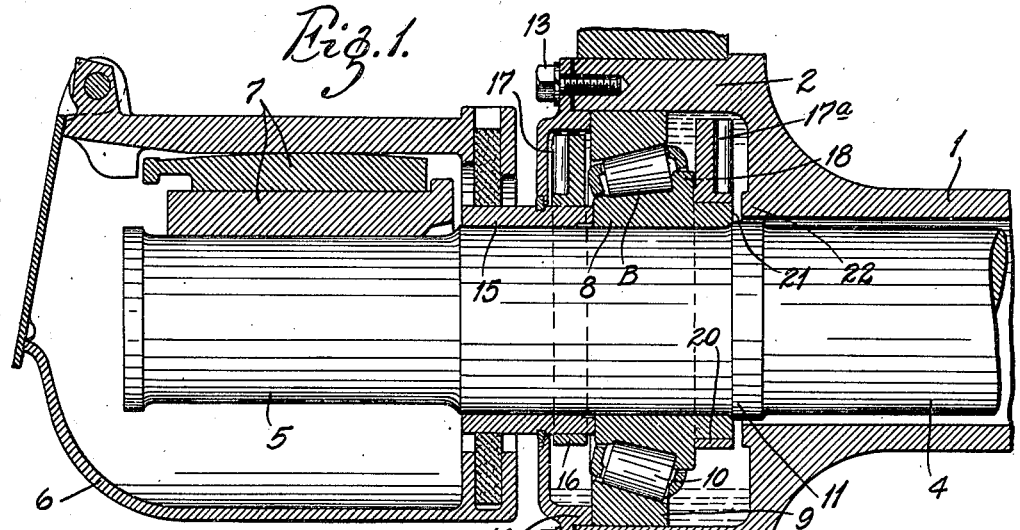
INVENTOR
Walter C. Sanders,
by Carr, Carr & Gravely,
HIS ATTORNEYS.

Patented Sept. 1, 1936

2,052,897

UNITED STATES PATENT OFFICE 2,052,897

AXLE BEARING LUBRICATOR

Walter C. Sanders, Canton, Ohio, assignor to The Timken Roller Bearing Company, Canton, Ohio, a corporation of Ohio Application July 20, 1935, Serial No. 32,360

2 Claims. (Cl. 308—180)

My invention relates to the lubrication of axle bearings particularly railway car locomotive and tender axle bearings of that type wherein the bearings are interposed between a rotatable axle housing on which the wheels are mounted and a normally stationary axle extending through said housing and having its ends mounted in a truck frame. The invention has for its object an efficient lubrication of such bearings.

The invention consists principally in providing one or more baffle members at the end of the stationary bearing member of said bearing to divert to the bearing oil thrown thereagainst by the rotation of the axle housing. The invention further consists in the axle bearing lubricator and in the parts and combinations and arrangements of parts hereinafter described and claimed.

In the accompanying drawing, which forms part of this specification and wherein like symbols refer to like parts wherever they occur, Fig. 1 is a vertical sectional view of an axle bearing construction provided with lubricators embodying my invention, Fig. 2 is a detail view of one of said lubricators, Fig. 3 is a sectional view on the line 3—3 in Fig. 2, Fig. 4 is a fragmentary sectional view similar to Fig. 1 showing a modified form of lubricator, Fig. 5 is a vertical sectional view of another modification, and Fig. 6 is a detail view showing a modified form of the lubricator shown in Fig. 4.

The accompanying drawing shows one end portion of a railway car axle construction including a tubular axle housing 1 provided with an enlarged portion 2 at each end on which is mounted a car wheel 3, and in which is kept a supply of lubricant for the bearing. An axle 4 extends through said axle housing and its projecting ends 5 are mounted in journal boxes 6, suitable plain bearing devices 7 being provided between each axle end and its journal box. The journal box is mounted in the usual frame member, not shown in the drawing.

Interposed between the axle 4 and the enlarged portion 2 of the axle housing is a taper roller bearing B comprising a cone 8 or inner bearing member, a cup 9 or outer bearing member and conical rollers 10 between said bearing members. The inner bearing member is seated against a shoulder 11 on the axle 4. A closure ring 12 secured to the end of said housing as by screws 13 is provided with a sleeve portion 14 that abuts against the cup 9 to hold it in position. At the outer or small end of the bearing cone 8 is a spacer sleeve 15 that extends along the axle from said bearing cone 8 to the plain bearing member 7 in said journal box.

In constructions of the kind above described, the axle 4 normally remains stationary, the axle housing 1 rotating. The lubrication of the bearings of this type of axle construction has presented a very serious problem due to the fact that the outer bearing member 9 and the tubular axle housings 1 and 2 rotate and the centrifugal force resulting therefrom causes the lubricating oil to be spread in a layer of equal depth around the inside periphery of the housing 2; in which position the lubricating oil will not adequately lubricate the bearing cone, particularly the thrust rib thereof against which the large ends of the rollers abut. The present invention provides a simple, inexpensive and efficient device for properly lubricating such bearings.

On said spacer sleeve 15 is a ring 16 on which are baffle blades 17 which are concavely curved and which are arranged in pairs in V-form, with the point of the V disposed toward the bearing member. Thus, the baffles 17 are disposed angularly with respect to the bearing axis and regardless of the direction of rotation of the axle housing, the oil that is carried around by centrifugal force during the rotaton of the housing will be trapped by the troughs of some of said baffles 17 and will be directed thereonto the small end of the bearing cone. As is well known, taper roller bearings have a pumping action and oil received by the small ends of the rollers 10 will lubricate said rollers and will work its way to the large end of the bearing where it will lubricate the thrust rib 18. The drawing illustrates a single pair of baffles, each operating in one direction of rotation of the housing, but there may obviously be as many such baffles as are desired.

At the large end of the bearing is a similar baffle device for directing oil to the large ends of the rollers and the inner bearing member to assist in lubrication thereof. As shown in Fig. 1, said baffle members 17a are formed on a counterbored ring 20 that is mounted on the end of the bearing cone 8, so that a portion 21 of the end face of said bearing cone between the axle shoulder and said ring is left exposed. By this arrangement, the portion 22 of the tubular axle housing that projects beyond the end wall of the enlarged wheel carrying portion 2 of said housing may be moved endwise against said bearing cone 8 to loosen or withdraw the bearings from the axle without abutting against or damaging said lubricating member.

In the construction shown in Fig. 4, the ring 30 that carries the baffle blades 17b at the large end of the bearing is mounted on the axle shoulder 11, said baffles being of different form from those of Figs. 1 and 2.

In Fig. 5 is shown a modification wherein a ring 40 disposed at the small end of the bearing has arms 41 to each of which is secured a tubular baffle member 42 having its lower end 43 projecting into the oil supply so that oil is forced thereinto, and its upper end 44 terminating adjacent to the bearing rollers so as to feed oil thereto. At the large end of the bearing a ring 45 has arms 46 to which are secured tubes 47 whose upper ends open into the oil supply and which deliver oil to the thrust rib and the large ends of the rollers.

In Fig. 6, the ring 50 has pairs of spaced arms to which are secured open trough members 51.

The above described construction is simple and inexpensive and it adequately lubricates bearings whose lubrication has hitherto been very difficult.

Obviously, numerous changes in details of construction, as in the number, form and location of the baffles, may be made without departing from the invention. Therefore, I do not wish to be limited to the precise construction shown and described.

What I claim is:

1. In an axle housing construction comprising a normally stationary axle, a rotary axle housing surrounding said axle and a roller bearing between said axle and said housing, a lubricating member comprising pairs of vanes arranged in V-form located at the end of the inner bearing member of said bearing with their points disposed towards said bearing member.

2. In an axle housing construction comprising a normally stationary axle, a rotary axle housing surrounding said axle and a roller bearing between said axle and said housing, a lubricating member comprising pairs of troughed vanes arranged in V-form located at the end of the inner bearing member of said bearing with their points disposed towards said bearing member.

WALTER C. SANDERS.